US011322142B2

(12) United States Patent
Yin et al.

(10) Patent No.: US 11,322,142 B2
(45) Date of Patent: May 3, 2022

(54) ACOUSTIC SENSING-BASED TEXT INPUT METHOD

(71) Applicant: Beijing University of Posts and Telecommunications, Beijing (CN)

(72) Inventors: Huanpu Yin, Beijing (CN); Anfu Zhou, Beijing (CN); Liang Liu, Beijing (CN); Huadong Ma, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 146 days.

(21) Appl. No.: 16/675,816

(22) Filed: Nov. 6, 2019

(65) Prior Publication Data
US 2020/0279560 A1 Sep. 3, 2020

(30) Foreign Application Priority Data
Sep. 6, 2018 (CN) .......................... 201811039200.2

(51) Int. Cl.
*G10L 15/22* (2006.01)
*G10L 15/04* (2013.01)
(Continued)

(52) U.S. Cl.
CPC .............. *G10L 15/22* (2013.01); *G10L 15/04* (2013.01); *G10L 15/26* (2013.01); *G10L 15/30* (2013.01);
(Continued)

(58) Field of Classification Search
CPC ......... G10L 15/00; G10L 15/04; G10L 15/22; G10L 15/26; G10L 15/30; G10L 2015/223; G10L 25/00; G10L 25/21; G10L 25/24
See application file for complete search history.

(56) References Cited

U.S. PATENT DOCUMENTS

2006/0161992 A1* 7/2006 Kempf ............... G06K 9/00154
726/34

FOREIGN PATENT DOCUMENTS

CN 101494049 7/2009
CN 202870516 4/2013
(Continued)

OTHER PUBLICATIONS

T. Yu, H. Jin and K. Nahrstedt, "Audio Based Handwriting Input for Tiny Mobile Devices," 2018 IEEE Conference on Multimedia Information Processing and Retrieval (MIPR), 2018, pp. 130-135, doi: 10.1109/MIPR.2018.00030. (Published: Jun. 28, 2018) (Year: 2018).*

(Continued)

*Primary Examiner* — Daniel C Washburn
*Assistant Examiner* — Sean E Serraguard
(74) *Attorney, Agent, or Firm* — Mark E. Bandy; Rankin Hill & Clark, LLP

(57) ABSTRACT

Embodiments of the present application provide an acoustic sensing-based text input method, comprising: obtaining audio information corresponding to text to be input; dividing the audio information to obtain an audio segment for each letter to be recognized in the text to be input; sending to the server, a type of the text to be input, the audio segments for letters to be recognized, and arrangement of the audio segment for the letter to be recognized in the audio information; receiving input result returned by the server, and displaying, based on the input result, text information corresponding to the text to be input on the display screen of the mobile terminal. The method allows effective text input without relying on a display screen.

4 Claims, 3 Drawing Sheets

(51) Int. Cl.
*G10L 15/26* (2006.01)
*G10L 15/30* (2013.01)
*G10L 25/21* (2013.01)
*G10L 25/24* (2013.01)

(52) U.S. Cl.
CPC .............. *G10L 25/21* (2013.01); *G10L 25/24* (2013.01); *G10L 2015/223* (2013.01)

(56) References Cited

FOREIGN PATENT DOCUMENTS

| | | |
|---|---|---|
| CN | 106982096 | 7/2017 |
| CN | 107894830 | 4/2018 |
| CN | 108132995 | 6/2018 |

OTHER PUBLICATIONS

Poster Abstract: Ubiquitous Writer: Robust Text Input for Small Mobile Devices via Acoustic Sensing; YIN et al; 2018 IEEE Conference on Computer Communications Poster and Demo (INFOCOM'18 Poster/Demo); 3 pages.
Office Action dated Mar. 2, 2020; App. No. CN 201811039200.2; 9 pages.

* cited by examiner

ACOUSTIC SENSING-BASED TEXT INPUT METHOD

CROSS REFERENCE TO RELATED APPLICATION

The present application claims the priority to Chinese Patent Application No. 2018110392002 filed with the China National intellectual Property Administration on Sep. 6, 2018 and entitled "ACOUSTIC SENSING-BASED TEXT INPUT METHOD", which is incorporated herein by reference in its entirety.

TECHNICAL FIELD

The present application relates to the technical field of artificial intelligence, in particular to an acoustic sensing-based text input method.

BACKGROUND

With the continuous development of artificial intelligence technology, mobile terminals such as smart phones and tablet computers are playing an increasingly important role in daily life of users, for example, in information inquiry, commodity purchasing, and communicating with other users. When using a mobile terminal, users often need to input text, words and the like on the screen of the mobile terminal through a soft keyboard. However, since the size of the display screen of the mobile terminal is typically small, it is inconvenient to perform input operation via the soft keyboard displayed on the display screen of the terminal. This is particularly true for elders, as their input operation is more prone to errors. In addition, with the rapid development of wearable devices, mobile terminals are becoming more portable and miniaturized. This problem is exacerbated.

Therefore, there is an urgent need for an effective text input method that does not rely on the display screen.

SUMMARY OF THE INVENTION

Embodiments of the present application provide an acoustic sensing-based text input method, device, mobile terminal, and server, to achieve effective text input without relying on a display screen.

The specific technical solution is as follows:

in a first aspect, embodiments of the present application provide an acoustic sensing-based text input method, applicable to a mobile terminal, comprising:

obtaining audio information corresponding to text to be input, wherein, the audio information is sound data generated from user writing the text to be input on an object other than a display screen of the mobile terminal;

dividing the audio information to obtain an audio segment for each letter to be recognized in the text to be input;

sending the following information to the server: a type of the text to be input, the audio segments for letters to be recognized, and arrangement of the audio segment for the letter to be recognized in the audio information. So that the server determines an input result for the text to be input based on the type of the text to be input, the audio segment for the letter to be recognized, and the arrangement of the audio segment for the letter to be recognized in the audio information; and receiving the input result returned by the server, and displaying, based on the input result, text information corresponding to the text to be input on the display screen of the mobile terminal.

In a second aspect, embodiments of the present application provide another acoustic sensing-based text input method, applied to a server, comprising:

receiving the following information from a mobile terminal: a type of text to be input, an audio segment for each letter to be recognized in the text to be input, and arrangement of the audio segment for the letter to be recognized in the audio information. Wherein the audio information is sound data generated from user writing the text to be input on an object other than a display screen of the mobile terminal;

determining an input result for the text to be input, based on the type of the text to be input, the audio segment for the letter to be recognized in the text to be input, and the arrangement of the audio segment for the letter to be recognized in the audio information; and returning the input result to the mobile terminal.

In a third aspect, embodiments of the present application provide an acoustic sensing-based text input device, applicable to a mobile terminal, comprising:

an audio information obtaining module, configured to obtain audio information corresponding to text to be input, wherein, the audio information is sound data generated from user writing the text to be input on an object other than a display screen of the mobile terminal;

an audio information dividing module, configured to divide the audio information to obtain an audio segment for each letter to be recognized in the text to be input;

an audio information sending module, configured to send to, the server, a type of the text to be input, the audio segments for letters to be recognized, and arrangement of the audio segment for the letter to be recognized in the audio information, so that the server determines an input result for the text to be input based on the type of the text to be input, the audio segment for the letter to be recognized, and the arrangement of the audio segment for the letter to be recognized in the audio information;

a text display module, configured to receive the input result returned by the server, and displaying, based on the input result, text information corresponding to the text to be input on the display screen of the mobile terminal.

In a fourth aspect, embodiments of the present application provide another acoustic sensing-based text input device, applicable to a server, comprising:

an audio information receiving module, configured to receive, from a mobile terminal, a type of text to be input, an audio segment for each letter to be recognized in the text to be input, and arrangement of the audio segment for the letter to be recognized in the audio information, wherein the audio information is sound data generated from user writing the text to be input on an object other than a display screen of the mobile terminal;

an input result determining module, configured to determine an input result for the text to be input based on the type of the text to be input, the audio segment for the letter to be recognized in the text to be input, and the arrangement of the audio segment for the letter to be recognized in the audio information;

an input result returning module, configured to return the input result to the mobile terminal.

In a fifth aspect, embodiments of the present application provide a mobile terminal, comprising a processor, a communication interface, a memory, and a communication bus, wherein the processor, the communication interface, and the memory complete communication with each other through the communication bus;

the memory is configured to store a computer program;

the processor is configured to execute the program stored on the memory to perform the method steps of any of the acoustic sensing-based text input methods provided by the above first aspect.

In a sixth aspect, embodiments of the present application provide a mobile terminal, comprising a processor, a communication interface, a memory, and a communication bus, wherein the processor, the communication interface, and the memory complete communication with each other through the communication bus;

the memory is configured to store a computer program;

the processor is configured to execute the program stored on the memory to perform the method steps of any of the acoustic sensing-based text input methods provided by the above second aspect.

According to a seventh aspect, embodiments of the present application provide a computer readable storage medium, having a computer program stored thereon which, when executed by a processor, causes the processor to perform the method steps of any of the acoustic sensing-based text input methods provided by the above first aspect.

According to an eighth aspect, embodiments of the present application provide a computer readable storage medium, having a computer program stored thereon which, when executed by a processor, causes the processor to perform the method steps of any of the acoustic sensing-based text input methods provided by the above second aspect.

It can be seen that, in the solutions provided by the embodiments of the present application, when a user inputs text to be input in the mobile terminal, the user does not need to operate on soft keyboard displayed on the display screen of the mobile terminal, but can write the text to be input on an object other than the display screen of the mobile terminal. the mobile terminal can obtain the audio information generated from the user's writing through acoustic sensing, and then the mobile terminal can process the audio information and send the processing result to the server. After receiving the above processing result, the server can obtain an input result of the text to be input through further processing, and return it to the mobile terminal. In this way, the mobile terminal can display the text information of the text to be input on the display screen based on the received input result. Therefore, when the user inputs the text to be input on the mobile terminal, effective text input can be realized without relying on the display screen.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings in the following description are only for some embodiments of the present application, other drawings may be obtained by those of ordinary skill in the art without any creative effort based on these drawings.

FIG. 2(*b*) is a schematic flow chart of type analysis for a sound-attributed audio frame;

DETAILED DESCRIPTION OF THE INVENTION

The technical solutions of the present application will be further described clearly and completely below with reference to the accompanying drawings of the embodiments of the present application. It is apparent that the described embodiments are only a part of the embodiments of the present application, and not all of them. All other embodiments obtained by a person of ordinary skill in the art based on the embodiments of the present application without any creative effort fall within the protection scope of the present application.

Currently, since the size of the display screen of the mobile terminal is usually small, it is inconvenient to perform input operation via the soft keyboard displayed on the display screen of the terminal, especially for the old people, as their input operation is more prone to errors. In addition, with the rapid development of wearable devices, mobile terminals are becoming more portable and miniaturized. The problem is thus further exacerbated. In order to solve the problems in the prior art, embodiments of the present application provide an acoustic sensing-based text input method, device, mobile terminal, and server.

A first acoustic sensing-based text input method provided by an embodiment of the present application, applicable to a mobile terminal, is described below.

It should be noted that, in embodiments of the present application, a mobile terminal may be any mobile terminal that can perform text input, such as a mobile phone or a tablet computer. Moreover, the function software for implementing an acoustic sensing-based text input method applicable to a mobile terminal provided by embodiments of the present application may be implemented as a plug-in of an existing client software, or as a dedicated acoustic sensing client. All these are appropriate.

Figure 1:
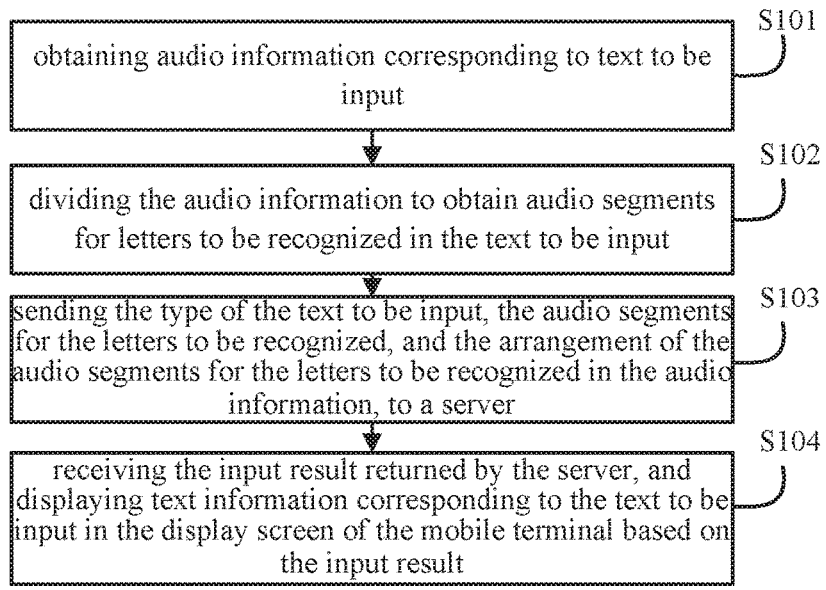
FIG. 1 is a schematic flowchart of a first acoustic sensing-based text input method, applicable to a mobile terminal provided by an embodiment of the present application.

FIG. 1 is a schematic flowchart of an acoustic sensing-based text input method provided by an embodiment of the present application. The method is applicable to a mobile terminal. As shown in FIG. 1, the method can comprise the following steps:

S101, obtaining audio information corresponding to text to be input.

The audio information is sound data generated when a user writes the text to be input on an object other than the display screen of a mobile terminal.

When a user wants to input text on the display screen of a mobile terminal, the user can write the text on another object than the display screen of the mobile terminal. Then, the mobile terminal can obtain audio information generated during the text writes.

It is noted that, in embodiments of the present application, the text to be input may be alphabetic text, i.e., text consisting of one or more letters in, for example, English, Italian, etc.

In embodiments of the present application, the other object can be an object where the mobile terminal is placed. In this case, a user may write the text with stationaries such as a crayon, a fountain pen, or a ballpoint pen. For example, the desktop on which the mobile terminal is placed can be taken as a target object. A user can write text on the desktop with a crayon. The object can also be a specific device for the user to write the text to be input. In this case, the user may also write the text with another specific device, for example, a dedicated writing device configured based on the acoustic sensing-based text input method provided by embodiments of the present application. All these are appropriate.

When the user writes the text to be input on the other object, the mobile terminal can obtain hereby generated audio signals by various means. For example, an electronic device can capture the generated audio signals though a built-in microphone. When the user writes with a dedicated device, the dedicated device may capture the audio signals generated and then send the signals to the mobile terminal via a communication connection therewith. All these are appropriate.

Embodiments of the present application are not limited in the forms of the target object, the manners in which a user writes words, and the manners in which the mobile terminal obtains audio information.

For example, the mobile terminal is placed on a desktop. The user writes English words on the desktop beside the mobile terminal using a pen. The mobile terminal can capture, through a built-in microphone, the sound from the friction between the crayon and the desktop when the user writes the words, thus obtaining audio information.

S102, dividing the audio information to obtain audio segments for letters to be recognized in the text to be input.

After obtaining the audio information, the mobile terminal can divide the audio information. Because the text to be input written by the user in the above-described step S101 consists of one or more letters (i.e., letters to be recognized), the mobile terminal can divide the audio information obtained into audio segments for letters to be recognized in the text to be input.

For clarity, the above-described step S102 will be described in detail below.

S103, sending the type of the text to be input, the audio segments for the letters to be recognized, and the arrangement of the audio segments for the letters to be recognized in the audio information, to a server, so that the server determines an input result of the text to be input based on the type of the text to be input, the audio segments for the letters to be recognized, and the arrangement of the audio segments for the letters to be recognized in the audio information.

When the user wants to input the text to be input on the display screen of the mobile terminal, an input region of the text to be input needs to be displayed on the display screen of the mobile terminal. Thus, the user can operate to place the cursor in the input region. For example, the user can click on an empty space inside the input region. The mobile terminal then obtains the type of the text to be input based the user's operation on the display screen user operation.

Optionally, the type of the text to be input can be a password, a word, or in another type. All those are appropriate.

For example, when the user needs to log in to WeChat on a mobile phone, the user places the cursor inside a WeChat password input box displayed on the display screen of the mobile phone by clicking on an empty space inside the box. Then, the mobile phone can obtain that the type of the text to be input is a password.

As another example, when a user needs to search information on a mobile phone, the user places the cursor inside a search box displayed on the display screen of the mobile phone by clicking on an empty space inside the box. Then, the mobile phone can obtain that the type of the text to be input is word.

After obtaining the type of the text to be input and the audio segments for the letters to be recognized, the mobile terminal may send the type of the text to be input, the audio segments of the letters to be recognized, and the arrangement of the audio segments for the letters to be recognized in the audio information. In this way, the server can determine the input result of the text to be input based on the type of the text to be input, the audio segments for letters to be recognized, and the arrangement of the audio segments for letters to be recognized in the audio information.

The letters to be recognized are arranged in the text to be input according to a sequence in which they are written by the user. Therefore, an early written letter has a forward position in the text to be input and would thus produce a sound early in time.

Therefore, in the above-described step S102, the arrangement of the audio segments for letters to be recognized in the audio information corresponds to the arrangement of the letters to be recognized in the text to be input. In other words, a letter to be recognized has a rank in the text to be input that is the same with the rank the corresponding audio augment has in the audio information.

S104, receiving the input result returned by the server, and displaying text information corresponding to the text to be input in the display screen of the mobile terminal based on the input result.

It can be understood that, after determining the input result of the text to be input, the server can return the input result to the mobile terminal. Thus, the mobile terminal can receive the input result, and display text information corresponding to the text to be input on the display screen of the mobile terminal based on the input result.

The text information can be displayed at a preset location in the display screen of the mobile terminal. The preset location can be set as required in practice. For example, the location is situated at a third portion from the bottom of the display screen, or in an input box selected by the user. All these are appropriate.

Optionally, in a specific implementation, the server returns a letter string as the input result. The mobile terminal can display the letter string on the display screen.

Optionally, in a specific implementation, the server returns multiple letter strings. The mobile terminal can first display the multiple letter strings on the display screen, and then receive a selection command from the user. The selection command includes an identifier of one of the above-described multiple letter strings. The mobile terminal can display the letter string corresponding to the identifier on the display screen based on the identifier. The other letter strings in the above-described multiple letter strings are not displayed. The above-described step S104 is hereby completed.

It can be seen that, in the solution provided by the embodiments of the present application, when a user inputs a text to be input in the mobile terminal, the user does not need to operate on a soft keyboard displayed on the display screen of the mobile terminal, but can write the text to be input on another object other than the display screen of the mobile terminal. The mobile terminal can obtain the audio information generated from the writing through acoustic sensing. The mobile terminal can then process the audio information and send the processing result to the server. After receiving the above processing result, the server can obtain an input result of the text to be input through further processing, and return it to the mobile terminal. As such, the mobile terminal is able to display the text information of the text to be input on the display screen based on the received input result. Therefore, when the user can input the text to be input on the mobile terminal without relying on the display screen.

The above-described step S102 of dividing the audio information to obtain audio segments, each of which corresponds to one of letters to be recognized in the text to be input is described in an example.

Specifically, the above-described S102 can comprise:

Step A1: dividing the audio information into a plurality of audio frames, and adding a frame number to each of the audio frames.

The frame number of an earlier audio frame is smaller than that of a later audio frame.

The mobile terminal can divide the above-described audio information into a plurality of audio frames in terms of the generation time thereof. This process begins with the earliest time information. A frame number is added to each audio frame based on the temporal order of generation, so that the frame number of an earlier audio frame is smaller than those of subsequent audio frames.

The frame number of each audio frame can start from 0, and increments by 1 each time. It can also start from 1, and increments by 1 each time. It can also start from 1, and increments by 2 each time. There can even be no determined increment, so long as the frame number of an audio frame earlier in time is smaller than the frame number of an audio frame later in time. All these are appropriate.

For example, when the mobile terminal captures an audio signal through a built-in microphone, the mobile terminal can divide the audio signal into audio frames. This may starts from the signal captured first and relies on the time of capturing the audio signal. Then a frame number of 1 can be added to the audio frame captured earliest in time, a frame number of 2 can be added to the next frame, and so forth, until a frame number is added to the audio frame captured latest in time.

Step A2: determining the type of each of the audio frames in an ascending order of the frame numbers.

After adding a frame number to each audio frame, the mobile terminal can determine the type of each audio frame in an ascending order of the frame number.

It can be understood that, the moment the mobile terminal starts to obtain the above-described audio information is not the moment when the user starts to write the text to be input. In other words, the text writing and the audio information start at different moments. Therefore, in the above-described audio information, in a preset time period from the starting moment of the audio information, there is no sound from writing but background noise. The preset time period is generally 1s. Of course, the duration of the preset time period can be of another value as required in practice. All these are appropriate.

Therefore, the above-described audio information can include two types of audio sections. One is a mute section. An audio section in a preset time period from the starting moment of audio information is of this type. In this section, there is only environment background noise but no sound from writing. An audio frame in a mute section is a mute-attributed frame. Obviously, the first audio frame in the above-described audio frames, i.e. the audio frame with the smallest frame number, is a mute-attributed section. The other is sound section, i.e., an audio section in which a word to be recognized is written. An audio frame in a sound section is a sound-attributed section. Obviously, there may also be audio frames corresponding to a transition from a mute-attributed section to a sound-attributed section in the above-described audio information. These audio frames are transition-attributed frames.

For the sound-attributed sections in the above-described audio information, each consists of a starting frame, an ending frame, and one or more sound-attributed frames located between the starting frame and the ending frame.

Therefore, an audio frame can be one of a first type, a second type, and a third type. The starting frame of a sound section in the audio information is of the first type. The ending frame of a sound section in the audio information is of the second type. Other frames than the starting frame and the ending frame of a sound section in the audio information are of the third type.

For clarity, the above-described step A2 will be described in detail below.

Step A3: dividing the audio information into a plurality of sound sections based on the frame numbers of audio frames determined to be of the first type and audio frames determined to be of the second type, and determining audio segments for letters to be recognized in the text to be input based on the plurality of sound sections.

After determining the type of each audio frame, the mobile terminal can divide the audio information into a plurality of sound sections based on the frame numbers of the audio frames determined to be of the first type and frames determined to be of the second type, and further determine an audio segment for each letter to be recognized in the text to be input based on the plurality of sound sections.

The determination of an audio segment for each letter to be recognized in the text to be input based on the plurality of sound sections can be implemented by various means in embodiments of the present application. Embodiments are not limited in this aspect.

Optionally, in one specific implementation, in the above-described step A3, determining an audio segment for each letter to be recognized in the text to be input based on the plurality of sound sections may include:

determining each of the plurality of sound sections as an audio segment for a letter to be recognized in the text to be input.

In this implementation, the mobile terminal can determine each of the plurality of sound sections as an audio segment for a letter to be recognized in the text to be input. The audio segments for letters to be recognized in the audio information are arranged according to the sequence of letters to be recognized in the text to be recognized.

Optionally, in another implementation, in the above-described step A3, determining an audio segment for each letter to be recognized in the text to be input based on the plurality of sound sections may include:

combining the plurality of sound sections into a plurality of audio segments based on a preset combination rule, and determining each audio segment as the audio segment for a letter to be recognized in the text to be input.

Some letter, for example, "à" in French, may not be written with one stroke. The audio segment for such a letter includes several sound sections.

Thus, in the implementation, the mobile terminal can combine the several sound sections based on a preset combination rule to obtain a combined sound section, and determine each audio segment as the audio segment of a letter to be recognized in the text to be input. In addition, the audio segments for letters to be recognized in the audio information are arranged according to the sequence of letters to be recognized in the text to be recognized.

Of course, embodiments of the invention are not limited in the aspect of the preset rule.

Specifically, in the implementation, a determination can be made as to whether the time interval between two sound sections is smaller than a preset duration, i.e., whether the interval between the ending frame of the sound segment earlier in time and the starting frame of the subsequent sound segment is smaller than a preset duration. If the interval is smaller than the preset duration, then the two sound sections can be combined. If the interval is not smaller than the preset duration, the segments may not be combined. Thus, when, after multiple combinations, it is achieved that the time interval between each every two sound sections is not smaller than the preset duration, and then the multiple sound sections combined can be determined as the multiple audio segments.

The above-described duration can generally be 0.6 s. Of course, the preset duration can be of another value. All these are appropriate.

In addition, as described in the above step A2, a sound section consists of multiple continuous audio frames. Further, in step A1, when adding a frame number to each audio frame, an earlier audio frame has a smaller frame number than a later audio frame. Therefore, as to two sound sections in the above-described audio information, the frame number of the ending fame of the sound section earlier in time is smaller than the frame number of the starting frame of the sound section later in time.

Therefore, in the above-described step A3, the mobile terminal can divide the audio information into a plurality of sound sections based on the frame numbers of audio frames determined to be of the first type and audio frames determined to be the second type in the following way:

Step B1: using each of the frame numbers of the audio frames determined to be of the first type as a target starting frame number;

Step B2: for each target starting frame number, determining a frame number in the frame numbers of the audio frames determined to be of the second type that has the smallest difference from the target starting frame number as a target ending frame number corresponding to the target starting frame number.

Step B3: for each target starting frame number, determining an audio frame corresponding to the target starting frame number and an audio frame corresponding to the target ending frame number of the target starting frame number, and determining audio frames corresponding to the frame numbers between these two audio frames as a sound section.

For example, audio information is divided into 10 sound frames, having frame numbers 1 to 10. Audio frames having frame numbers of 2 and 7 are determined to be of the first type, and audio frames having frame numbers of 5 and 9 are determined to be of the second type.

For a target starting frame number of 2, it can be determined that the target ending frame number corresponding to the target starting frame number is 5. As such, the audio frames with the frame numbers 2, 3, 4, and 5 in the above-described audio information constitute a sound section. For a target starting frame number of 7, it can be determined that the target ending frame number corresponding to the target starting frame number is 9. As such, the audio frames with frame numbers 7, 8, and 9 in the above-described audio information constitute a sound section. Therefore, the audio information can be divided into two sound sections.

Of course, the mobile terminal can divide the audio information into multiple sound sections based on the frame numbers of the audio frames determined to be of the first type and the second type in another way. Embodiments are not limited in this aspect.

It should be noted that, the above-described steps A1 to A3 are merely one implementation of the above-described step S102 of embodiments of the invention. Any other implementations of the above-described step S102 all fall within the scope of embodiments of the invention.

The above-described step A2 of determining the type of each of the audio frames in an ascending order of the frame numbers is described using examples below.

Optionally, in one implementation, the above-described step A2 may include: analyzing, in an ascending order of frame numbers, the audio frames to obtain types thereof.

According to the description of the attributes and types of audio frames in the above-described step A2, an audio frame may have one of three attributes: mute, a transition and sound; and be of one of three types: the first type, the second type, and the third type. The audio frames may be analyzed in various manners, depending attributes thereof.

It should be noted that, the first audio frame among the plurality of audio frames is a mute-attributed frame. In other words, the audio frame with the smallest frame number in the above-described audio frames is mute-attributed. The attribute of an audio frame in the multiple audio frames other than the first audio frame is determined based on a previous audio frame.

Figure 2A:
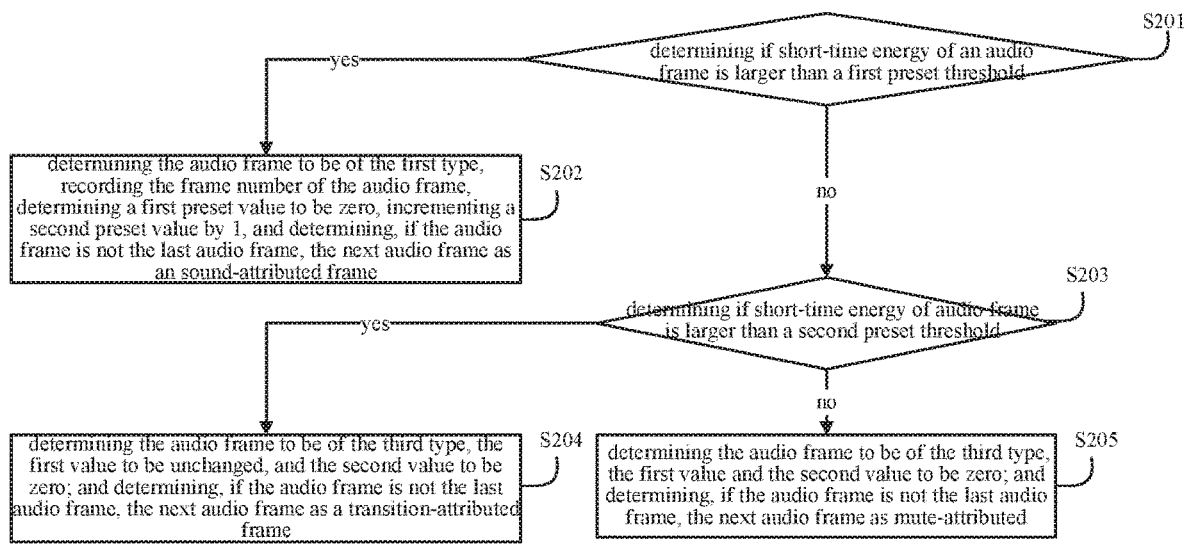
FIG. 2(*a*) is a schematic flow chart of type analysis for a mute-attributed or a transition-attributed audio frame.
Figure 2B:
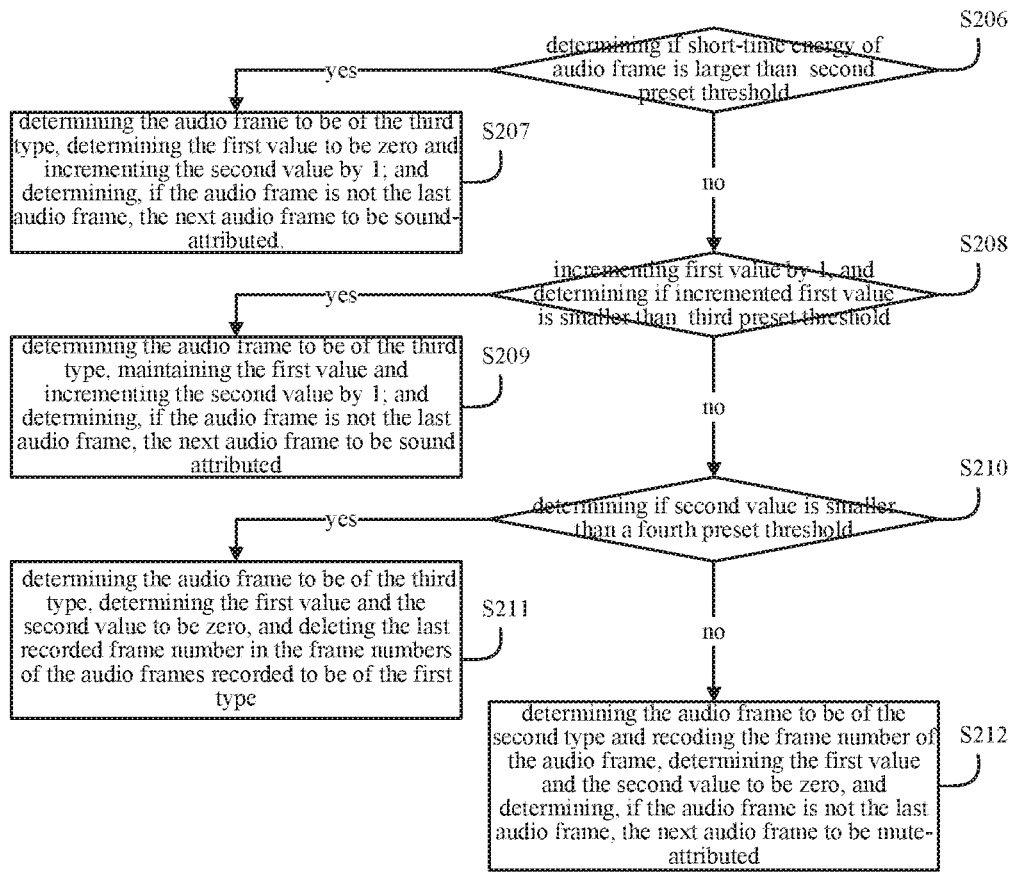

Specifically, FIG. 2(a) is a flow chart of the type analysis for a mute-attributed or a transition-attributed audio frame. FIG. 2(b) is a flow chart of the type analysis for a sound-attributed audio frame.

As shown in FIG. 2(a), analyzing a mute-attributed or transition-attributed audio frame to obtain a type thereof can comprise the following steps:

S201: determining whether the short-time energy of an audio frame is larger than a first preset threshold, and if so, performing S202, otherwise, performing S203.

For a mute-attributed or transition-attributed audio frame, the mobile terminal can determine whether the short-time energy of the audio frame is larger than a first preset threshold, and if so, S202 is performed, otherwise, S203 is performed.

The short-time energy (STE) of each audio frame can be obtained through the following equation:

$$STE = \sum_{n=t}^{t+L} x(n)^2$$

x(n) denotes the audio information signal generated at an nth moment in the audio information; t is the starting moment of the audio frame; L is the frame length of the audio frame; and, STE is the short-time energy of the audio frame obtained by calculation.

In addition, the preset first threshold can be: the sum of ½ of the standard deviation of the short-time energies of all the audio frames of a mute-attributed section and the average of the short-time energies of all the audio frames of the mute section. Of course, the preset first threshold can be of another value as required in practice. All these are appropriate.

S202: determining the audio frame to be of the first type, recording the frame number of the audio frame, determining a first preset value to be zero, incrementing a second preset value by 1, and determining, if the audio frame is not the last audio frame, the next audio frame as a sound-attributed frame.

The preset first value and the preset second value are not fixed, and both are used as counting units. The first preset value can be understood as the number of audio frames contained in the current mute section. The second preset value can be understood as the number of audio frames contained in the current sound section. It should be noted that, the current mute section can be understood as an audio segment consists of the audio frame and one or more previous mute-attributed audio frames. The current sound section can be understood as an audio section consists of the audio frame and one or more previous sound-attributed audio frames.

An audio frame having a short-time energy larger than the first preset threshold can be determined to be of the first type, i.e., a starting frame of a sound frame. The mobile terminal can then record the frame number of the sound frame.

In addition, the mobile terminal can increment the second preset value by 1 to obtain a new second value, and reset the first value to zero. The mobile terminal can determine whether the audio frame is the last audio frame, i.e., whether the audio frame has the largest frame number among the plurality of audio frames. If the audio frame is not the last audio frame, the mobile terminal determines that the next audio frame as a sound-attributed frame.

Obviously, when performing type analysis processing on the audio frame following this audio frame, the steps shown in FIG. 2(b) needs to be executed, i.e., the following step S206 is first executed.

S203: determining whether the short-time energy of the audio frame is larger than a second preset threshold, and if so, performing S204, otherwise, performing S205;

If the short-time energy of the audio frame is not larger than the first preset second threshold, the mobile terminal is not able to determine the type of the audio frame, and needs to further determine whether the short-time energy of the audio frame is larger than a second preset threshold, and if so, performing S204, otherwise, performing S205.

The preset second threshold can be the average of the short-time energies of all the audio frames of a mute section. Of course, the second preset threshold can be of another value as required in practice. All these are appropriate. It should be noted that, the second threshold is smaller than the first threshold in the above-described step S201.

S204: determining the audio frame to be of the third type, the first value to be unchanged, and the second value to be zero; and determining, if the audio frame is not the last audio frame, the next audio frame as a transition-attributed frame.

If the short-time energy of the audio frame is larger than the second preset threshold, the mobile terminal can determine that the audio frame is of the third type, i.e., an audio frame located between the starting frame and the ending frame in a sound section. Thus, the mobile terminal may not record the frame number of the audio frame.

In addition, the mobile terminal can maintain the first value unchanged from its current value, and reset the second value to zero. At this point, the mobile terminal can determine whether the audio frame is the last audio frame. If the audio frame is not the last audio frame, the mobile terminal determines the next audio frame as transition-attributed.

Obviously, when continuing to analyze a subsequent audio frame, the method would proceed back to the above-described step S201.

S205: determining the audio frame to be of the third type, the first value and the second value to be zero; and determining, if the audio frame is not the last audio frame, the next audio frame as mute-attributed.

If the short-time energy of the audio frame is not larger than the second preset threshold, the mobile terminal can determine that the audio frame is of the third type. Thus, the mobile terminal may not record the frame number of the audio frame.

In addition, the mobile terminal can also reset both the first value and the second value to zero. The mobile terminal can then determine whether the audio frame is the last audio frame. If the audio frame is not the last audio frame, the mobile terminal determines next audio frame to be mute-attributed.

Obviously, when continuing to analyze a subsequent audio frame, the method would proceed back to the above-described step S201.

As shown in FIG. 2(b), for a sound-attributed audio frame, analyzing the audio frame to obtain the type thereof can comprise the following steps:

S206: determining whether the short-time energy of the audio frame is larger than the second preset threshold, and if so, performing S207, otherwise, performing S208.

If the audio frame is sound-attributed, the mobile terminal can determine whether the short-time energy of the audio frame is larger than the second preset threshold, and if so, executing S207, otherwise, executing S208.

S207: determining the audio frame to be of the third type, determining the first value to be zero and incrementing the second value by 1; and determining, if the audio frame is not the last audio frame, the next audio frame to be sound-attributed.

If the short-time energy of the audio frame is larger than the second preset threshold, the mobile terminal can determine that the audio frame is of the third type. Thus, the mobile terminal may not record the frame number of the audio frame.

In this case, the mobile terminal can reset the first value to zero, and increment the second value by 1 to obtain a new second value. Further, the mobile terminal can determine whether the audio frame is the last audio frame. If the audio frame is not the last audio frame, the terminal determines the next audio frame to be sound-attributed.

Obviously, when continuing to analyze a subsequent audio frame, the method would proceed back to the above-described step S206.

S208: incrementing the first value by 1, and determining whether the incremented first value is smaller than a third preset threshold, and if so, performing S209, otherwise, performing S210.

If the short-time energy of the audio frame is not larger than the second preset threshold, the mobile terminal is unable to determine the type of the audio frame. The mobile terminal increments the first value by 1 to obtain a new first value, and further determines whether the new first value is smaller than the third preset threshold and if so, performs S209, otherwise, performs S210.

The third preset threshold can be understood as a preset maximum mute section length that represents the minimum interval length between sound sections. The third threshold can be set as required in practice. Embodiments are not limited in this aspect.

S209: determining the audio frame to be of the third type, maintaining the first value and incrementing the second value by 1; and determining, if the audio frame is not the last audio frame, the next audio frame to be sound attributed.

If the new first value obtained in the above-described step S208 is smaller than the third preset threshold, it is indicated that the number of audio frames included in the current mute section is smaller than the preset maximum mute section length. The mobile terminal can determine that the audio frame is of the third type. The mobile terminal may not record the frame number of the audio frame.

In addition, the mobile terminal can also maintain the first value, and increment the second value by 1 to obtain a new second value. The mobile terminal can then determine whether the audio frame is the last audio frame. If the audio frame is not the last audio frame, the mobile terminal determines the next audio frame to be sound-attributed.

Obviously, when continuing to analyze a subsequent audio frame, the method would proceed back to the above-described step S206.

S210: determining whether the second value is smaller than a fourth preset threshold, and if so, performing S211, otherwise, performing S212.

If the new first value obtained in the above-described step S208 is not smaller than the preset third threshold, the mobile terminal is unable to determine the type of the audio frame, and may need to further determine whether the second value is smaller than the preset fourth threshold, and if so, S211 is performed, otherwise, S212 is performed.

The fourth preset threshold can be understood as a minimum sound section length. This fourth threshold can be as required in practice. Embodiments are not limited in this aspect.

S211: determining the audio frame to be of the third type, determining the first value and the second value to be zero, and deleting the last recorded frame number in the frame numbers of the audio frames recorded to be of the first type. When the audio frame is not the last audio frame, determining the next audio frame as a mute-attributed frame.

A second value smaller than the fourth preset threshold indicates that the number of the audio frames included in the current sound section is smaller than the present minimum sound section length. The mobile terminal can determine that the audio frame is of the third type. In this case, the mobile terminal may not record the frame number of the audio frame.

In addition, the mobile terminal can also reset both the first value and the second value to zero, and delete the last recorded frame number in the frame numbers of the audio frames that are recorded to be of the first type, i.e., delete the frame number with the smallest difference with the frame number of this audio frame in the frame numbers of the audio frames of the first type that have been recorded.

When the mobile terminal is executing the above-described step A3, i.e., dividing the audio information into a plurality of sound sections based on the frame numbers of the audio frames determined to be of the first type and the second type, the frame numbers used do not include those deleted in step S211.

The mobile terminal can then determine whether the audio frame is the last audio frame, and when the audio frame is not the last audio frame, determine the next audio frame to be a mute-attributed frame.

Obviously, for the type analysis of the next audio frame, the steps shown in FIG. 2(a) need to be performed. The above-described step S201 is performed first.

S212: determining the audio frame to be of the second type and recoding the frame number of the audio frame, determining the first value and the second value to be zero, and determining, if the audio frame is not the last audio frame, the next audio frame to be mute-attributed.

If the second value is not smaller than the preset fourth threshold, it is indicated that the number of audio frames contained in the current sound section is not smaller than the preset minimum sound section length. The mobile terminal can determine that the audio frame is of the second type, i.e., an ending frame of sound. Thus, the mobile terminal can record the frame number of the audio frame.

In addition, the mobile terminal can also reset both the first value and the second value to zero. The mobile terminal can then determine whether the audio frame is the last audio frame, and determine, if the audio frame is not the last audio frame, the next audio frame to be mute-attributed.

Obviously, for the type analysis of the next audio frame, the steps shown in FIG. 2(a) need to be performed. The above-described step S201 is performed first.

In the above-described steps S201 to S212, the mobile terminal can have two storage spaces. One is used for storing frame numbers of audio frames determined to be of the first type. This storage space is denoted by B. The other is used for recording frame numbers of audio frames determined to be of the second type, and is denoted by E. Of course, the frame numbers of audio frames determined to be of the first type and the frame numbers of audio frames determined to be of the second type can be recorded by other means. All these are appropriate.

It should be noted that the above-described steps S201 to S212 are merely one implementation of realizing the above-described step A2 of embodiments of the invention. Modes other than this implementation that are able to implement the above-described step A2 all fall within the scope of protection of embodiments of the invention.

Corresponding to the first acoustic sensing-based text input method applicable to a mobile terminal, embodiments of the present application further provide a second acoustic sensing-based text input method applicable to a server.

Figure 3:
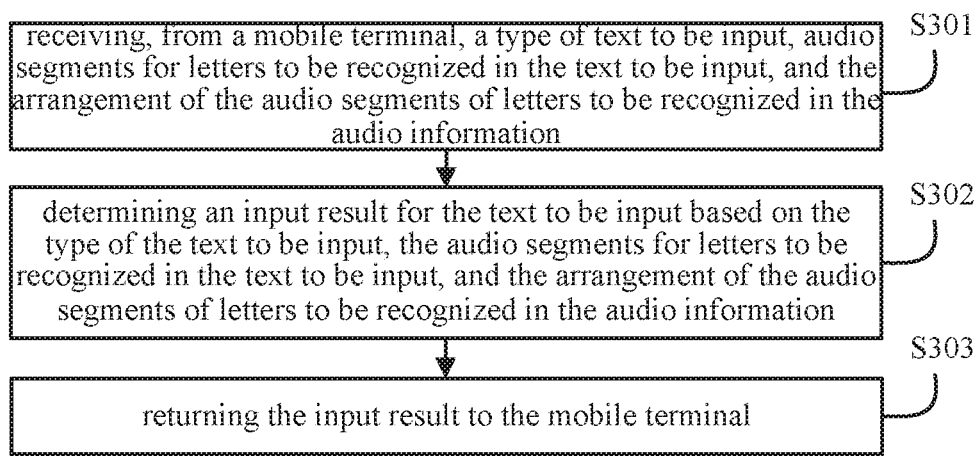
FIG. 3 is a schematic flowchart of a second acoustic sensing-based text input method, applicable to a server provided by another embodiment of the present application.

FIG. 3 is a schematic flowchart of a second acoustic sensing-based text input method which applicable to a server provided by an embodiment of the present application. As shown in FIG. 3, the method may comprise the following steps:

S301: receiving, from a mobile terminal, a type of text to be input, audio segments for letters to be recognized in the text to be input, and the arrangement of the audio segments of letters to be recognized in the audio information.

The audio information is sound data generated when a user writes the text to be input on another object than the display screen of the mobile terminal.

In the first acoustic sensing-based text input method applicable to a mobile terminal provided by the embodiments of the present application, the mobile terminal sends, to the server, the type of the text to be input, audio segments for letters to be recognized in the text to be input, and the arrangement of the audio segments for letters to be recognized in the audio information. Therefore, in the second acoustic sensing-based text input method applicable to a server provided by an embodiment of the present application, the server can receive the type of the text to be input, the audio segments for letters to be recognized in the text to be input, and the arrangement of the audio segment for letters to be recognized in the audio information sent by the mobile terminal.

S302: determining an input result for the text to be input based on the type of the text to be input, the audio segments for letters to be recognized in the text to be input, and the arrangement of the audio segments of letters to be recognized in the audio information;

After receiving the type of text to be input, audio segments for letters to be recognized in the text to be input, and the arrangement of the audio segments for letters to be recognized in the audio information sent by a mobile terminal, the server may determine an input result of the text to be input based on the type of the text to be input, the audio segments for letters to be recognized in the text to be input, and arrangement of the audio segments for letters to be recognized in the audio information.

It can be understood that, for different types of text to be input, the input result for the text to be input are different. For example, the text to be input may be a password of letters, typically consisting of an unordered and meaningless string of letters. The server can directly determine obtained target string as the input result of the text to be input. For another example, the text to be input is a word. The input result of the text to be input should also be a word. Therefore, for different types of text to be input, the server may perform the above-described step S302 in different manners so as to determine the input result of the text to be input.

For example, if the type of the text to be input is a password, the server may directly determine that the input result of the text to be input is a character string. If the type of the text to be input is a word, the server may determine several words as the input result of the text to be input based on a preset word library, audio segments for letters to be recognized in the text to be input, and the arrangement of the audio segments for letters to be recognized in the audio information.

It should be noted that, according to actual needs in practice, the server may determine the input result of the text to be input in various manners. Embodiments of the present application are not limited in. For sake of clarity, the above step S302 will be explained later with examples.

S303, returning the input result to the mobile terminal.

After determining the input result of the text to be input, the server may return the input result to the mobile terminal, so that the mobile terminal can receive the input result, and display the text information corresponding to the text to be input in the display screen based on the input result.

It can be seen that, in the solutions provided by the embodiments of the present application, when a user inputs a text to be input in the mobile terminal, the user does not need to operate on soft keyboard displayed on the display screen of the mobile terminal. The user may write the text to be input on another object than the display screen of the mobile terminal. The mobile terminal can obtain the audio information generated from the writing through acoustic sensing. Then the mobile terminal can process the audio information and send the processing result to the server. After receiving the above processing result, the server can obtain an input result of the text to be input through further processing, and return it to the mobile terminal. In this way, the mobile terminal can display the text information of the text to be input on the display screen based on the received input result. Therefore, the user can input the text to be input into the mobile terminal without relying on the display screen.

The above step S302 of determining an input result of the text to be input based on the type of the text to be input, audio segments for letters to be recognized in the text to be input, and the arrangement of the audio segments for letters to be recognized in the audio information will be described with reference to the following examples.

When the type of the text to be input is a password, the above step S302 may comprise the following steps:

Step C1: calculating, for an audio segment for each letter to be recognized, distances between the audio segment for the letter to be recognized and letter template samples in a preset letter sample library, as multiple target distances corresponding to the audio segment for the letter to be recognized.

After receiving password-typed text to be input, an audio segment for a letter to be recognized, and arrangement of the audio segment for the letter to be recognized in the audio information, the server can calculate, for the received audio segment of the letter to be recognized, distances between the audio segment for the letter to be recognized and letter template samples in a preset letter sample library. The calculated distances can be used as the multiple target distances corresponding to the audio segment for the letter to be recognized.

Wherein, the preset letter sample library includes a plurality of samples and each sample is an audio corresponding to one letter, and the samples are audios pre-collected which are generated when multiple users write various letters on multiple target objects in multiple different manners. For example, when the text to be input is an English word, the corresponding preset letter sample library includes audios of writing 26 English letters in multiple writing cases.

Further, one of the letter template samples corresponds to one letter and is determined from multiple samples corresponding to the letter. In other words, for each letter, one sample is selected from all the samples corresponding to the letter in the preset letter sample library as a letter template of the sample. For the sake of clarity, the determination manner of the sample of any letter template will be described in detail later.

It should be noted that the server may calculate multiple target distances corresponding to the audio segment for the letter to be recognized in various manners. Embodiments are not limited in this aspect.

Optionally, in a specific implementation, the foregoing step C1 may comprise the following steps:

Step D1: for the audio segment for each letter to be recognized, aligning the audio segment for the letter to be recognized with each of the letter template samples in the preset letter sample library.

It can be understood that, due to the writing speed and the like, the length of the audio segment for the letter to be recognized may not be equal to that of a letter template sample, so that the audio segment for the letter to be recognized cannot be directly compared with a letter template sample. Therefore, in the present implementation, it is necessary to align the audio segment for the letter to be recognized with each letter template sample in the preset letter sample library.

Specifically, in the foregoing step D1, a fast alignment mechanism based on DTW (Dynamic Time Warping) may be employed. The main process is as follows: for the audio segment for each letter to be recognized, a variation trend curve of the audio segment for the letter to be recognized and each letter template (i.e. an envelope) are extracted, then each envelope is divided into frames and the average of the sampling points of each frame is taken to reduce the number of sampling points, and finally the DTW is used to perform the alignment of the audio segment of the letter to be recognized with each letter template.

Of course, in the above step D1, the server can also use other alignment methods. All these are appropriate.

Step D2: for the audio segment for the letter to be recognized, extracting a first Mel frequency cepstrum coefficient of the aligned audio segment for the letter to be recognized and a second Mel frequency cepstrum coefficient of each letter template sample, and calculating a distance between the audio segment for the letter to be recognized and each letter template sample based on the first Mel frequency cepstral coefficient and each second Mel frequency cepstrum coefficient, so as to obtain multiple target distances corresponding to the audio segment for the letter to be recognized.

For the audio segment for a letter to be recognized, after aligning the audio segment for the letter to be recognized with each letter template sample in the preset letter sample library, a first Mel Frequency Cepstral Coefficients (MFCC) of the aligned audio segment for the letter to be recognized and a second Mel frequency cepstral coefficient for each letter template sample may be extracted.

Then, based on the extracted first Mel frequency cepstrum coefficient and each second Mel frequency cepstrum coefficient, the distance between the audio segment for the letter to be recognized and each letter template sample can be calculated. In other words, for each letter template sample, a distance between the audio segment for the letter to be recognized and the letter template sample can be calculated as a target distance based on the extracted first Mel frequency cepstrum coefficient and the second Mel frequency cepstral coefficient of the letter template sample. Since there are multiple letter template samples, multiple target distances corresponding to the audio segment for the letter to be recognized can be calculated. Furthermore, multiple target distances corresponding to the audio segment of each letter to be recognized can be calculated.

Wherein, the above target distance can be calculated according to the distance calculation formula shown below:

$$\operatorname{dis tan } ce(x_{ij}) = \|x_i - y_j\|^2_{l_2}$$

wherein, dis tan $ce(x_{ij})$ is the distance between the audio segment for the i-th letter to be recognized and the j-th letter template sample, $x_i$ is the first Mel frequency cepstrum coefficient of the audio segment for the i-th letter to be recognized, $y_j$ is the second Mel frequency cepstral coefficient of the j-th letter template sample, $1 \} i \} N$, N is the number of audio segments of the letters to be recognized, $1 \} j \} M$, M is the number of the letter template samples.

Step C2: obtaining a target letter string based on the multiple target distances corresponding to the audio segments for letters to be recognized, and the arrangement of the audio segments for letters to be recognized in the audio information, and taking the target letter string as the input result of the text to be input.

After calculating multiple target distances corresponding to letters to be recognized, the server may obtain a target letter string based on the target distances corresponding to the audio segments for letters to be recognized, and the arrangement of the audio segments for letters to be recognized in the audio information, and use the target letter string as the input result of the text to be input;

The server may obtain the target letter string in various manners. Embodiments are not limited in this aspect. For the sake of clarity, the above step C2 will be described below with reference to examples.

Optionally, in a specific implementation, the foregoing step C2 may comprise the following steps:

Step 1 determining, for the audio segment for the letter to be recognized, a first preset number of target distances from the multiple target distances corresponding to the audio segment for the letter to be recognized, and determining a letter associated with the letter template samples corresponding to the first preset number of target distances as a target letter corresponding to the audio segment of the letter to be recognized, wherein any of the first preset number of target distances is smaller than any other target distance in the multiple target distances.

After determining multiple target distances corresponding to a letter to be recognized, for the audio segment of the letter to be recognized, the server may determine the first preset number of letter template samples, starting from the letter template samples corresponding to the minimum target distance and according to an ascending order of the target distances. Further, the letter associated with the first preset number of letter template samples is determined as the target letter corresponding to the audio segment of the letter to be recognized.

It can be understood that, the letter template sample corresponding to a smaller target distance is more similar to the audio segment for the letter to be recognized, so that the probability that the letter associated with the letter template sample is the letter to be recognized is greater. Then, the letter associated with the letter template samples can be determined as the target letter corresponding to the audio segment for the letter to be recognized.

The first preset number may be set according to different situations in the actual application. For example, the first preset number may be 5, or the first preset number may be 3, and the like. All those are appropriate.

For example, when the text to be input is in English, for the audio segment for a letter to be recognized, the target letters of the audio segments of five letters to be recognized may be determined as: a, b, d, f, w according to the target distances corresponding to the audio segments for the letters to be recognized.

Step E2: for the audio segment for the letter to be recognized, first calculating, distances between the audio segment for the letter to be recognized and reference samples in the letter sample library, wherein a reference sample is a sample of the target letter corresponding to the audio segment of the letter to be recognized.

For the audio segment for a letter to be recognized, after determining the target letter corresponding to the audio segment for the letter to be recognized, the server may obtain samples of each target letter from the above-mentioned letter sample library, and use these samples as reference samples. Further, the server can calculate a first distance between the audio segment of the letter to be recognized and each reference sample.

The server may calculate the first distance in various manners. Embodiments are not limited in this aspect. For example, the first distance between the audio segment for the letter to be recognized and each reference sample may be calculated according to the extracted Mel frequency cepstrum coefficients of the audio segment of the letter to be recognized and of each reference sample.

For example, the text to be input is in English, and each letter has 10 samples in the letter sample library. For the audio segment for a letter to be recognized, the target letters are determined to be a, b, d, f, w. In the letter sample library, each of the letters a, b, d, f, and w has 10 corresponding samples respectively. As such, these 50 samples are the reference samples of the audio segments for the letters to be recognized. Therefore, 50 first distances need to be calculated.

Step E3: for the audio segment for the letter to be recognized, determining a second preset number of first distances from the first distances corresponding to the audio segment for the letter to be recognized, and determining reference letters corresponding to the second preset number of first distances as candidate letters corresponding to the audio segment for the letter to be recognized, wherein, any of the second preset number of first distances is smaller than any other distance in the first distances.

For the audio segment for the letter to be recognized, after calculating multiple first distances corresponding to the audio segment for the letter to be recognized, the server may determine a second preset number of reference samples starting from the reference sample corresponding to the smallest first distance according to an ascending order of the first distances. Therefore, letters corresponding to the second preset number of reference samples can be determined as the candidate letters corresponding to the audio segment for the letter to be recognized.

It can be understood that a reference letter corresponding to a smaller first distance has a more similar feature to the audio segment of the letter to be recognized, so that the probability that the letter corresponding to the reference letter is the letter to be recognized is greater. Then, the letters can be determined as the candidate letters corresponding to the audio segment for the letter to be recognized.

The second preset number may be set according to different situations in the actual application. For example, the second preset number may be 3, or the second preset number may be 4, and the like. All these are appropriate.

For example, for English text to be input, each letter has 10 samples in the letter sample library. For the audio segment for a certain letter to be recognized, the target letters are determined to be a, b, d, f, w. Therefore, and 5 candidate letters a, a, a, f, d can be determined from the 50 reference samples in total.

Step E4: determining, for the audio segment for the letter to be recognized, the most frequent letter among the candidate letters corresponding to the audio segment for the letter to be recognized, and determining the most frequent as an input letter represented by the audio segment for the letter to be recognized.

For the audio segment for a letter to be recognized, after determining the candidate letters corresponding to the audio segment of the letter to be recognized, the server may determine the most frequent letter among the candidate letters, and determine the most frequent letter as the input letter represented by the audio segment of the letter to be recognized.

It can be understood that each candidate letter has a certain possibility of being an input letter represented by the audio segment for the letter to be recognized. Candidate letters having a larger number would have a greater probability of being the input letter represented by the audio segment of the letter to be recognized. Then, the letter that appears the most frequently has the greatest possibility of being the input letter represented by the audio segment for the letter to be recognized. As such, this letter can be determined as the input letter represented by the audio segment for the letter to be recognized.

For example, for English text to be input, each letter in the letter sample library has 10 samples. For an audio segment of a letter to be recognized, target letters are determined to be a, b, d, f, w, and 5 candidate letters are determined to be: a, a, a, f, d. Then the letter that appears the most frequently in the candidate letters is a, so that it can be determined that the input letter represented by the audio segment of the letter to be recognized is a.

Step E5: arranging the input letters represented by the audio segment for letters to be recognized according to the arrangement of the audio segments for letters to be recognized in the audio information, to obtain the target letter string.

After determining the input letter represented by the audio segment of the letter to be recognized, the server may arrange the determined input letters according to the arrangement of the audio segments for letters to be recognized in the audio information, so as to obtain the target letter string.

For example, the determined number of audio segments for letters to be recognized is 6, and the determined input letter distribution of the audio segments for letters to be recognized is: a, e, c, p, c, t, according to the arrangement of the audio segments for letters to be recognized in the audio information, the input letter represented by the audio segment for the first letter to be recognized is a, the input letter represented by the audio segment for the second letter to be recognized is c, the input letter represented by the audio segment for the third letter to be recognized is c, the input letter represented by the audio segment for the fourth letter to be recognized is e, the input letter represented by the audio segment for the fifth letter to be recognized is p, and the input letter represented by the audio segment for the sixth letter to be recognized is t. Then, the determined input letters are arranged in order according to the arrangement of the audio segments for letters to be recognized in the audio information, and the target letter string can be obtained as: accept.

Next, for the above step S302 of determining an input result of the text to be input based on the type of the text to be input, the audio segments for letters to be recognized in the text to be input, and the arrangement of the audio segments for letters to be recognized in the audio information will be described with more examples.

When the type of the text to be input is a word, the above step S302 may comprise the following steps:

Step F1: obtaining, in a preset word library, words having the same number of letters as the number of received audio segments for letters to be recognized as multiple candidate words.

After receiving the word-typed text to be input, audio segments for letters to be recognized and the arrangement of the audio segments for letters to be recognized in the audio information, the server can obtain, in a preset word library, words having the same number of letters as the number of received audio segments for letters to be recognized as multiple candidate words.

The capacity of the preset word library and the words it contains can be set according to actual needs, for example, it can contain commonly used 5000 words from the contemporary American English corpus. In addition, the preset word library may be stored in the server, or may be stored in other electronic devices that are in communication with the server, and when the server needs to determine the candidate word, the determined multiple candidate words are sent to the server based on the obtaining instruction sent by the server. All these are appropriate.

It can be understood that, since the audio segment for each letter to be recognized corresponds to a number to be recognized included in the text to be input, the number of audio segments for the letters to be recognized is the number of letters to be recognized included in the text to be input. Thus, the multiple candidate words obtained in the above step F1 are words having the same number of letters as the text to be input, and therefore, the input result of the text to be input may be one of the above candidate words.

Step F2: determining a candidate probability of each candidate word based on the audio segment of each letter to be recognized and the arrangement of the audio segment of each letter to be recognized in the audio information.

In order to determine the input result of the text to be input more accurately, after obtaining multiple candidate words, the server may determine the candidate probability of each candidate word based on the audio segment of each letter to be recognized.

The server may determine the candidate probability of each candidate word in various manners. Embodiments are not limited in this aspect.

Optionally, in a specific implementation, the foregoing step F2 may include:

Step G1: calculating, for the audio segment for a letter to be recognized, second distances between the audio segment of the letter to be recognized and samples in the letter sample library; and calculating, based on the calculated second distances, probabilities that the letter to be recognized corresponds to letter template samples as multiple alternative probabilities.

For the audio segment for a letter to be recognized, the server may calculate a second distance between the audio segment of the letter to be recognized and each of the samples in the letter sample library. Further, the server may calculate probabilities that the audio segment of the letter to be recognized corresponds to letter template samples as multiple alternative probabilities based on the calculated second distances.

Since each letter template sample corresponds to one letter, the probability that the audio segment for the letter to be recognized corresponds to a letter template sample is the probability that the input letter represented by the audio segment of the letter to be recognized is the letter corresponding to the letter temple sample.

For example, for English text to be input, in the above step G1, the server can determine the probabilities that the audio segment for a certain letter to be recognized is a letter a, b, c, . . . or z, thereby obtaining 26 alternative probabilities for the audio segment of the letter to be recognized.

It should be noted that the server may calculate the foregoing second distance in various manners. Embodiments are not limited in this aspect.

For example, the second distance between the audio segment for a letter to be recognized and each sample may be calculated according to the extracted Mel frequency cepstrum coefficient of the audio segment of the letter to be recognized and the Mel frequency cepstrum coefficient of the sample.

In addition, the server may calculate the foregoing alternative probability in various manners. Embodiments are not limited in this aspect.

Optionally, in a specific implementation, for the audio segment for a letter to be recognized, the server may determine the alternative probabilities of the audio segment for the letter to be recognized in the following manner. Specifically, the method may include:

Step H1: arranging the samples in the preset sample library according to a descending order of the calculated second distances, and setting a probability value for each sample, wherein the probability value of a sample having a large second distance is smaller than the probability value having a small distance.

Step H2: calculating the sum of the probability values of all the samples as the first probability sum, and calculating the sum of the probability values of the samples corresponding to a letter as the second probability sum of the letter.

Step H3: for each letter, calculating a ratio of the second probability of the letter to the first probability sum, and using the ratio as an alternative probability that the audio segment for the letter to be recognized corresponds to the letter.

For example, in a case where the text to be input is English and each letter in the letter sample library has 10 samples, the server can obtain 260 second distances for the audio segment for a letter to be recognized. Further, the second distances are arranged in a descending order, and a probability value is set for each sample. The probabilities start from 1. The probability value of the sample corresponding to the largest second distance is 1 and the probability value of the sample corresponding to the smallest second distance is 260. The sum of the probability values of all samples (i.e., the first probability sum) can be calculated as 33930. Assuming that the probability values of the 10 samples of the letter a are 1, 5, 67, 120, 3, 7, 87, 23, 45, 33, respectively, the probability sum of all samples of the letter a can be calculated, that is, the second probability of the letter a, as 391. Thus, the alternative probability that the audio segment for the letter to be recognized corresponds to the letter a can be calculated as 0.01. Similarly, the server can calculate alternative probabilities that the audio segment of the letter to be recognized correspond to the other 25 letters respectively.

Step G2: for each candidate word, determining, according to the arrangement of the audio segments for letters to be recognized in the audio information, audio segments for letters to be recognized corresponding to letters contained in the candidate word as target audio segments for letters contained in the candidate word.

For each candidate word obtained, the server may determine audio segments for letters to be recognized corresponding to letters contained in the candidate word according to the arrangement of the audio segment for letters to be recognized in the audio information, as target audio segments for letters contained in the candidate word.

Specifically, for each candidate word, the target audio segment for the first letter contained in the candidate word is the audio segment for the letter to be recognized arranged in the first place in the audio information. Likewise, the server can obtain the target audio segments for all the letters contained in the candidate word.

Step G3: determining, for each letter contained in each candidate word, a target probability of the letter, wherein the target probability is a probability in the multiple alternative probabilities of the target audio segment for the letter that corresponds to the target letter template sample, and a target letter template sample is a letter template sample corresponding to the letter in the letter sample library.

For a candidate word containing multiple letters, each of which corresponding to one target audio segment, the server may determine, among the multiple alternative probabilities of the target audio segments corresponding to the letter, a corresponding alternative probability that the input letter represented by the target audio segment is the letter according to the multiple alternative probabilities of the audio segment of each letter to be recognized obtained by calculation in the above step G1. Furthermore, the determined alternative probability is the target probability of the letter.

For example, in case where the text to be input is English and the candidate word is apple, among the multiple alternative probabilities of the target audio segment for the letter a, the corresponding alternative probability that the input letter represented by the target audio segment is a is 0.67. Then the target probability of the letter a is 0.67.

Step G4: for each candidate word, calculating a product of target probabilities of letters contained in the candidate word as a candidate probability of the candidate word.

For example, the text to be input is English and the candidate word is apple. The target probability corresponding to the letter a is 0.01, the target probability corresponding to the first letter p is 0.12, and the target probability corresponding to the second letter p is 0.35, the target probability corresponding to the letter l is 0.75, the target probability corresponding to the letter e is 0.87, and the candidate probability of the candidate word apple is 0.00027.

Step F3: determining, according to the candidate probabilities, a third preset number of candidate words among the multiple candidate words as an input result for the text to be input.

The probability of any of the third preset number of candidate words is greater than any other candidate word in the multiple candidate words.

After determining the candidate probability of each candidate word, the server may determine a third preset number of candidate words among the multiple candidate words as the input result for the text to be input based on the candidate probabilities.

The probability of each candidate word in the determined input result is greater than any candidate word other than the determined input result among the determined multiple candidate words. That is to say, the server may arrange the multiple candidate words in a descending order of candidate probabilities, and determine the candidate words arranged in the first third preset number of hits as the input result of the text to be input.

It should be noted that the third preset number may be set according to different situations in actual applications. For example, it may be 1, that is, the word with the highest candidate probability among the candidate words is determined as the input result of the text to be input; for another example, it may be 3, so that the candidate words with the highest candidate probabilities arranged in a descending order may be determined as the input result of the text to be input. Obviously, when the third preset number is greater than 1, the input result that the server can feed back to the mobile terminal includes words for the user to choose, so that the user can be provided with more choices.

In addition, optionally in a specific implementation, after determining the candidate probability of each candidate word, the server may further determine the candidate word whose candidate probability is greater than a preset probability threshold as the input result of the text to be input, and return the input result to the mobile terminal.

In the present implementation, when the text to be input is different, it is obvious that the number of candidate words included in the input result of the text to be input determined by the server may be different.

It should be noted that, based on the foregoing embodiment, when the type of the text to be input is a word, the server may determine the input result for the text to be input by combining the multiple steps in the above embodiment.

Specifically, the method includes:
based on the audio segments for letters to be recognized and the arrangement of the audio segments of the letters to be recognized in the audio information, the server may obtain the target letter string through the above steps C1 and C2;

after obtaining the target letter string, the server may first not use the obtained target letter string as the input result for the text to be input, but determine whether the target letter string is a word;

when it is determined that the target letter string is a word, the server can use the target letter string as the input result for the text to be input, in other words, at this time, the server can determine the word represented by the target letter string as the word corresponding to the text to be input.

When it is determined that the target letter string is not a word, the server can perform the above steps F1-F3 to obtain the input result of the text to be input.

An example of determining the letter template sample corresponding to any letter is given in the following.

Specifically, the letter template sample corresponding to any letter may be determined by the following manner, and the manner may include:

Step I1: calculating, for each sample of a letter in the letter sample library, a third distance between this sample and any other sample, and determining a sample corresponding to a minimum third distance as alternative sample of this sample.

For a letter, all samples in the letter sample library corresponding to this letter may be first determined, and further, for each of the determined samples, a third distance between this sample and any other sample may be calculated. In this way, the sample corresponding to the minimum distance among all the calculated third distances can be determined as the candidate sample corresponding to this sample.

The server may calculate the foregoing third distance in various manners. Embodiments are not limited in this aspect. For example, the third distance between two samples can be calculated based on the extracted Mel frequency cepstral coefficient of each sample.

Step I2: using a sample in the samples of the letter which is determined most frequently as the alternative sample as a letter template sample of the letter.

For each letter, after determining the candidate sample corresponding to each sample of the letter in the letter sample library, the sample that is determined most frequently as the alternative sample can be used as a letter template sample of this letter.

It can be understood that, for each letter, each sample corresponding thereto in the letter sample library corresponds to an alternative sample, which is one of other samples corresponding to this letter in the letter sample library. Thus, one sample can be an alternate sample corresponding to multiple samples. In other words, this sample is closer to these corresponding samples. A case that a sample among the samples corresponding to a letter is most frequently determined as an alternative sample indicates that this sample can best represent the letter among all the samples corresponding to the letter in the letter sample library. This sample may be taken as the letter template sample of the letter.

It should be noted that the preset letter sample library may be stored in a server, or may be stored in other electronic devices that are in communication with the server, and sent to the server according to an obtaining instruction of the server when the server needs it. All those are appropriate.

Of course, in addition to the above manner, the embodiment of the present application may also use other methods to determine each letter template sample. These are all possible.

It should be noted that, in the above step F2, when the candidate probability of each candidate word is determined, it may occur that the candidate probabilities of multiple candidate words may be the same. Then, when determining the input result of the text to be input based on the candidate probabilities in the above step F3, if the candidate words having the same candidate probability cannot be determined as the words included in the input result for the text to be input, the server needs to choose again among the candidate words having the same candidate probability.

Specifically, the server may first determine that the number of letters contained in each of the candidate words having the same candidate probability are the same as the input letters represented by the audio segment of each of the letter to be recognized determined in the above step E4. In this way, when the server chooses the candidate words with the same candidate probability again, the candidate words which have a greater number of same letters can be preferentially chosen as the input result of the text to be input.

For example, the candidate words with the same probability are: apple and hello, and the determined input letters of the audio segment of each letter to be recognized are: a, l, l, e, h, then the candidate word apple has 3 letters that are the same as those in the determined input letters, and the candidate word hello has 4 letters that are the same as those in the determined input letters, and the server can preferentially choose the candidate word hello as the input result of the text to be input.

It should be noted that, in the solution provided by the embodiment of the present application, the text to be input is usually alphabetic, that is, the text to be input is composed of letters, such as English, French, Italian, and the like.

Wherein, when the text to be input is a Chinese character, since each Chinese character is represented by its corresponding Chinese pinyin, when the user wants to input a Chinese character on the display screen of a mobile terminal, the user can write the pinyin of the Chinese character on the target object. Thus, by applying the solution provided by the embodiments of the present application, the server can determine the input result of the pinyin written by the user and feed it back to the mobile terminal, so that the mobile terminal can display multiple characters corresponding to the input result on the display screen after receiving the input result. For example, the mobile terminal may display a Chinese character having a higher frequency of use corresponding to the input result according to the frequency of use of the Chinese character obtained in advance.

In other words, when the user wants to input Chinese characters on the display screen of the mobile terminal, the traditional way of inputting Chinese pinyin via a soft keyboard on the display screen such that the mobile terminal displays multiple characters on the display screen according to the input Chinese pinyin for the user to choose is changed to the way that the mobile terminal obtains an audio signal generated when the user writes the Chinese pinyin of the Chinese character on the target object, and processes the audio signal together with the server, thereby displays multiple characters on the display screen of the mobile terminal for the user to choose.

Figure 4:
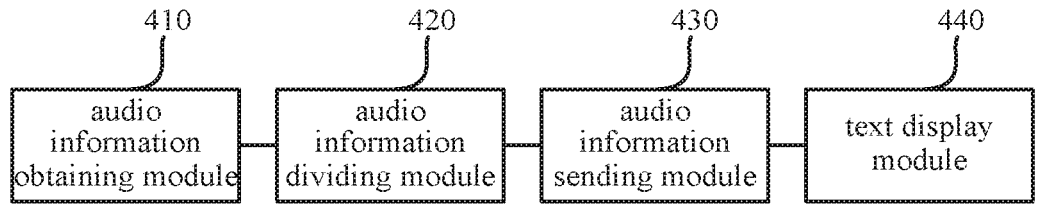
FIG. 4 is a schematic structural diagram of a first acoustic sensing-based text input device applicable to a mobile terminal provided by an embodiment of the present application.

Corresponding to the first acoustic sensing-based text input method applicable to a mobile terminal provided by the embodiments of the present application, the embodiments of the present application provide a first acoustic sensing-based text input device applicable to a mobile terminal, FIG. 4 is a schematic structural diagram of a first acoustic sensing-based text input device applicable to a mobile terminal provided by an embodiment of the present application. As shown in FIG. 4, the device may comprise the following modules:

an audio information obtaining module 410, configured to obtain audio information corresponding to text to be input, wherein, the audio information is sound data generated from user writing the text to be input on an object other than a display screen of the mobile terminal;

an audio information dividing module 420, configured to divide the audio information to obtain an audio segment for each letter to be recognized in the text to be input;

an audio information sending module 430, configured to send to, the server, a type of the text to be input, the audio segments for letters to be recognized, and arrangement of the audio segment for the letter to be recognized in the audio information, so that the server determines an input result for the text to be input based on the type of the text to be input, the audio segment for the letter to be recognized, and the arrangement of the audio segment for the letter to be recognized in the audio information;

a text display module 440, configured to receive the input result returned by the server, and displaying, based on the input result, text information corresponding to the text to be input on the display screen of the mobile terminal.

It can be seen that, in the solutions provided by the embodiments of the present application, when a user inputs a text to be input in the mobile terminal, the user does not need to operate on soft keyboard displayed on the display screen of the mobile terminal, but can write the text to be input on an object other than the display screen of the mobile terminal. the mobile terminal can obtain the audio information generated when the user is writing through acoustic sensing, and then the mobile terminal can process the audio information and send the processing result to the server. After receiving the above processing result, the server can obtain an input result of the text to be input through further processing, and return it to the mobile terminal. In this way, the mobile terminal can display the text information of the text to be input on the display screen based on the received input result. Therefore, when the user inputs the text to be input on the mobile terminal, effective text input can be realized without relying on the display screen.

As an implementation of the embodiment of the present application, the above audio information dividing module 420 may comprises:

an audio dividing sub-module, configured to divide the audio information into a plurality of audio frames, and adding a frame number to each of the audio frames, wherein, an audio frame earlier in time has a smaller frame number than a later audio frame;

an audio frame type determining sub-module, configured to a type of each audio frame in an ascending order of the frame numbers; wherein, an audio frame is of a type selected from a first type, a second type, and a third type, wherein, a starting frame of a sound section in the audio information is of the first type, an ending frame of a sound section in the audio information is of the second type; other frames than the starting frame and the ending frame of a sound section in the audio information are of the third type; and a sound section is an audio section during which a word to be recognized in the audio information is written; and an audio segment determining sub-module, configured to divide the audio information into a plurality of sound sections based on the frame numbers of the audio frames determined to be of the first type and the second type, and determine audio segments for letters to be recognized in the text to be input based on the sound sections.

As an implementation of the embodiment of the present application, the above frame type determining sub-module may comprise:

a type processing unit, configured to perform type analysis on each audio frame in an ascending order of the frame numbers to obtain the type of each audio frame.

wherein, for a mute-attributed audio frame or a transition-attributed frame, performing type analysis on an audio frame comprises the following steps:

S201: determining whether a short-time energy of the audio frame is larger than a first preset threshold, and if so, performing S202, otherwise, performing S203; wherein, the first audio frame in the plurality of audio frames is a mute-attributed frame, the attribute of any other audio frame in the plurality of audio frames than the first audio frame is determined based on a previous audio frame; a mute-attributed frame is an audio frame in a mute section, a mute section is an audio section corresponding to a preset time period from the starting moment of audio information in which there is no writing but environment background noise, and a transition-attributed frame is an audio frame that is in transition from a mute section to a sound section in the audio information;

S202: determining the audio frame to be of the first type, recording the frame number of the audio frame, determining a first preset value to be zero, and incrementing a second preset value by 1; and determining, if the audio frame is not the last audio frame, the next audio frame to be a sound-attributed frame; wherein a sound-attributed frame is an audio frame in the sound section;

S203: determining whether the short-time energy of the audio frame is larger than a second preset threshold, and if so, performing S204, otherwise, performing S205; wherein the second preset threshold is smaller than the first preset threshold;

S204: determining the audio frame to be of the third type, maintain the first value unchanged, and determining the second value to be zero; and determining, if the audio frame is not the last audio frame, the next audio frame as a transition-attributed frame;

S205: determining the audio frame to be of the third type, determining the first value and the second value to be zero; and determining, if the audio frame is not the last audio frame, the next audio frame as a mute-attributed frame;

for a sound-attributed frame, performing type analysis on an audio frame comprises:

S206: determining whether the short-time energy of the audio frame is larger than the second preset threshold, and if so, performing S207, otherwise, performing S208;

S207: determining the audio frame to be of the third type, determining the first value to be zero, incrementing the second value by 1; and determining, if the audio frame is not the last audio frame, the next audio frame as a sound-attributed frame;

S208: incrementing the first value by 1, and determining whether the incremented first value is smaller than a preset third threshold, and if so, performing S209, otherwise, performing S210;

S209: determining the audio frame to be of the third type, maintaining the first value, and incrementing the second value i by 1; and determining, if the audio frame is not the last audio frame, the next audio frame as a sound-attributed frame;

S210: determining whether the incremented second value is smaller than a fourth preset threshold, and if so, performing S211, otherwise, performing S212;

S211: determining the audio frame to be of the third type, determining the first value and the second value to be zero, and deleting the last recorded frame number in the frame numbers of the audio frames recorded as of the first type; and determining, if the audio frame is not the last audio frame, the next audio frame as a mute-attributed frame; and S212: determining the audio frame to be of the second type, recording the frame number of the audio frame, and determining the first value and the second value to be zero, and determining, if the audio frame is not the last audio frame, the next audio frame as a mute-attributed frame.

As an implementation of the present application, the above audio segment determining sub-module can comprise:

a first audio segment determining unit, configured to determine each of the sound sections as an audio segment for a letter to be recognized in the text to be input; or a second audio segment determining unit, configured to combine the sound sections into audio segments based on a preset combination rule, and determining each of the audio segments as an audio segment for a letter to be recognized in the text to be input.

Figure 5:
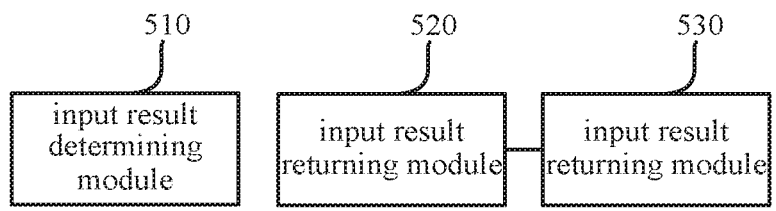
FIG. 5 is a schematic structural diagram of a second acoustic sensing-based text input method applicable to a server provided by an embodiment of the present application.

Corresponding to the second acoustic sensing-based text input method applicable to a server provided by the embodiments of the present application, the embodiments of the present application provide a second acoustic sensing-based text input device applicable to a server. FIG. 5 is a schematic structural diagram of a second acoustic sensing-based text input device applicable to a server provided by an embodiment of the present application. As shown in FIG. 5, the device may comprise the following modules:

an audio information receiving unit 510, configured to receive, from a mobile terminal, a type of text to be input, an audio segment for each letter to be recognized in the text to be input, and arrangement of the audio segment for the letter to be recognized in the audio information, wherein the audio information is sound data generated from user writing the text to be input on an object other than a display screen of the mobile terminal;

an input result determining module 520, configured to determine an input result for the text to be input based on the type of the text to be input, the audio segment for the letter to be recognized in the text to be input, and the arrangement of the audio segment for the letter to be recognized in the audio information; and an input result returning module 530, configured to return the input result to the mobile terminal.

It can be seen that, in the solutions provided by the embodiments of the present application, when a user inputs a text to be input in the mobile terminal, the user does not need to operate on soft keyboard displayed on the display screen of the mobile terminal, but can write the text to be input on an object other than the display screen of the mobile terminal. the mobile terminal can obtain the audio information generated when the user is writing through acoustic sensing, and then the mobile terminal can process the audio information and send the processing result to the server. After receiving the above processing result, the server can obtain an input result of the text to be input through further processing, and return it to the mobile terminal. In this way, the mobile terminal can display the text information of the text to be input on the display screen based on the received input result. Therefore, when the user inputs the text to be input on the mobile terminal, effective text input can be realized without relying on the display screen.

As an implementation of the embodiment of the present application, the above input result determining module 520 can comprise:

a target distance calculating sub-module, configured to, for text to be input of a password type, calculate, for an audio segment for each letter to be recognized, distances between the audio segment for the letter to be recognized and letter template samples in a preset letter sample library as multiple target distances corresponding to the audio segment for the letter to be recognized, wherein the preset letter sample library includes a plurality of samples, each of which is an audio corresponding to one letter, a letter template sample corresponds to one letter and is determined from a plurality of samples corresponding to the letter;

an input result determining sub-module, configured to obtain a target letter string based on the multiple target distances corresponding to the audio segments for letters to be recognized, and the arrangement of the audio segments for letters to be recognized in the audio information, and taking the target letter string as the input result of the text to be input.

As an implementation of the embodiment of the present application, the above target distance calculating sub-module can comprise:

an audio aligning unit, configured to, for the audio segment for the letter to be recognized, align the audio segment for the letter to be recognized with each of the letter template samples in the preset letter sample library;

a target distance calculating unit, configured to, for the audio segment for the letter to be recognized, extract a first Mel frequency cepstrum coefficient of the aligned audio segment for the letter to be recognized and a second Mel frequency cepstrum coefficient of each letter template sample, and calculate a distance between the audio segment for the letter to be recognized and each letter template sample based on the first Mel frequency cepstral coefficient and the second Mel frequency cepstrum coefficient, so as to obtain the multiple target distances corresponding to the audio segment for the letter to be recognized.

As an implementation of the embodiment of the present application, the above input result determining sub-module can comprise:

a target letter determining unit, configured to, for the audio segment for the letter to be recognized, determine a first preset number of target distances from the multiple target distances corresponding to the audio segment for the letter to be recognized, and determine a letter associated with the letter template samples corresponding to the first preset number of target distances as a target letter corresponding to the audio segment for the letter to be recognized, wherein, any of the first preset number of target distances is smaller than any other target distance in the multiple target distances;

a first distance calculating unit, configured to calculate, for the audio segment for the letter to be recognized, first distances between the audio segment for the letter to be recognized and reference samples in the letter sample library, wherein a reference sample is a sample of the target letter corresponding to the audio segment for the letter to be recognized;

a candidate letter determining unit, configured to determine, for the audio segment for the letter to be recognized, a second preset number of first distances from the first distances corresponding to the audio segment for the letter to be recognized, and determining reference letters corresponding to the second preset number of first distances as candidate letters corresponding to the audio segment for the letter to be recognized, wherein, any of the second preset number of first distances is smaller than any other distance in the first distances;

an input letter determining unit, configured to determine, for the audio segment for the letter to be recognized, the most frequent letter among the candidate letters corresponding to the audio segment for the letter to be recognized, and determining the most frequent letter as an input letter represented by the audio segment for the letter to be recognized; and a target letter string determining unit, configured to input letters represented by the audio segments for letters to be recognized according to the arrangement of the audio segments for letters to be recognized in the audio information, to obtain the target letter string.

As an implementation of the embodiment of the present application, the above input result determining module 520 can further comprise:

a candidate word obtaining sub-module, configured to, for text to be input of a word type, obtain, in a preset word library, words having the same number of letters as the number of received audio segments for letters to be recognized as multiple candidate words;

a candidate probability determining sub-module, configured to determine a candidate probability of each candidate word based on the audio segment for the letter to be recognized and the arrangement of the audio segment for the letter to be recognized in the audio information; and a second result determining sub-module, configured to determine, according to the candidate probabilities, a third preset number of candidate words among the multiple candidate words as an input result for the text to be input, wherein the probability of any of the third preset number of candidate words is greater than any other candidate word in the multiple candidate words.

As an implementation of the embodiment of the present application, the above candidate probability determining sub-module can further comprise:

an alternative probability determining unit, configured to calculate, for the audio segment for the letter to be recognized, second distances between the audio segment for the letter to be recognized and samples in the letter sample library; and calculating, based on the calculated second distances, probabilities that the letter to be recognized correspond to letter template samples as multiple alternative probabilities;

a target audio segment determining unit, configured to, for each candidate word, determine, according to the arrangement of the audio segments for letters to be recognized in the audio information, audio segments for letters to be recognized corresponding to letters contained in the candidate word as target audio segments for letters contained in the candidate word;

a target probability determining unit, configured to determine, for each letter contained in each candidate word, a target probability of the letter, wherein the target probability is a probability in the multiple alternative probabilities of the target audio segment for the letter that corresponds to the target letter template sample, and a target letter template sample is a letter template sample corresponding to the letter in the letter sample library; and a candidate probability determining unit, configured to, for each candidate word, calculate a product of the target probabilities of letters contained in the candidate word as a candidate probability of the candidate word.

Figure 6:
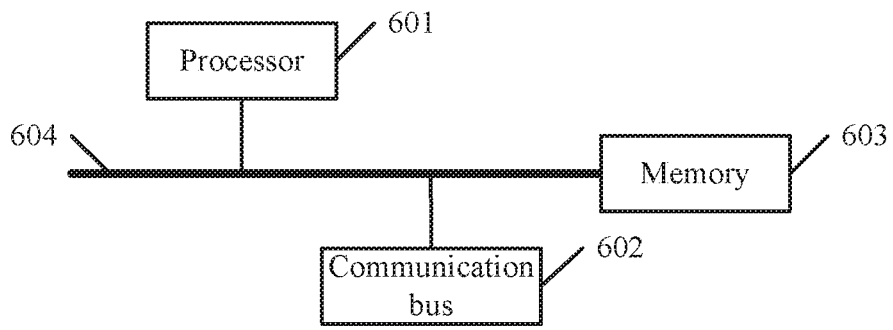
FIG. 6 is a schematic structural diagram of a mobile terminal provided by an embodiment of the present disclosure.

An embodiment of the present application further provides a mobile terminal, as shown in FIG. 6, including a processor 601, a communication interface 602, a memory 603, and a communication bus 604, wherein the processor 601, the communication interface 602, and the memory 603 complete communication with each other through the communication bus 604.

The memory 603 is configured to store a computer program.

The processor 601 is configured to perform the first acoustic sensing-based text input method applicable to the mobile terminal by executing the program stored on the memory 603.

Figure 7:
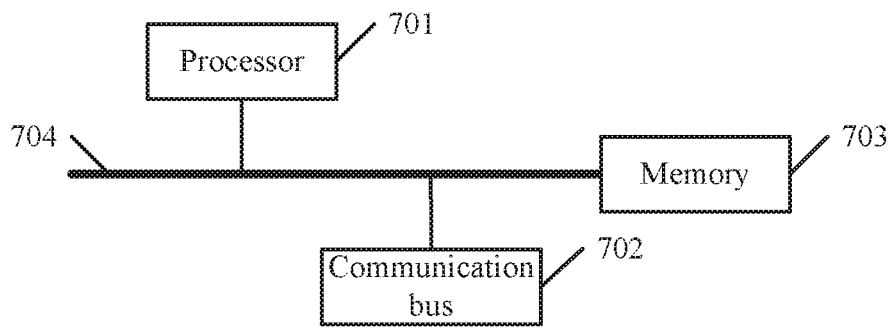
FIG. 7 is a schematic structural diagram of a server provided by an embodiment of the present application.

An embodiment of the present application further provides a server, as shown in FIG. 7, including a processor 701, a communication interface 702, a memory 703, and a communication bus 704, wherein the processor 701, the communication interface 702, and the memory 703 complete communication with each other through the communication bus 704.

The memory 703 is configured to store a computer program.

The processor 701 is configured to implement the second acoustic sensing-based text input method applicable to the server by executing the program stored on the memory 703.

The communication bus mentioned by the above mobile terminal and server may be a Peripheral Component Interconnect (PCI) bus or an Extended Industry Standard Architecture (EISA) bus. The communication bus can be divided into an address bus, a data bus, a control bus, and the like. For convenience of representation, only one thick line is shown in the figures, but it does not mean that there is only one bus or one type of bus.

The communication interface is used for communication between the above electronic device and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a central processing unit (CPU), a network processor (NP), etc.; or may be a digital signal processing (DSP), Application Specific Integrated Circuit (ARC), Field-Programmable Gate Array (FPGA) or other programmable logic device, discrete gate or transistor logic device, discrete hardware component.

An embodiment of the present application further provides a computer readable storage medium having a computer program stored thereon which, when being executed by a processor, causes the processor to perform the first acoustic sensing-based text input method applicable to a mobile terminal as described above.

An embodiment of the present application further provides a computer readable storage medium having a computer program stored thereon which, when being executed by a processor, causes the processor to perform the second acoustic sensing-based text input method applicable to a mobile terminal as described above.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "include" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the sentences "include(s) a." or "include(s) a." do not exclude that there are other identical elements in the processes, methods, articles, or devices which include these elements.

All of the embodiments in the description are described in a correlated manner, and various embodiments may share identical or similar parts. The description for each embodiment focuses on the differences from other embodiments. In particular, a brief description is provided to the system embodiment in view of their resemblance to the method embodiments. Relevant details can be known with reference to the description of the method embodiments.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An acoustic sensing-based text input method, applicable to a server, comprising:

receiving, from a mobile terminal, a type of text to be input, an audio segment for each letter to be recognized in the text to be input, and arrangement of the audio segment for the letter to be recognized in the audio information, wherein the audio information is sound data generated from user writing the text to be input on an object other than a display screen of the mobile terminal;

determining an input result for the text to be input based on the type of the text to be input, the audio segment for the letter to be recognized in the text to be input, and the arrangement of the audio segment for the letter to be recognized in the audio information; and returning the input result to the mobile terminal;

wherein determining an input result for the text to be input based on the type of the text to be input, the audio segments for letters to be recognized in the text to be input, and the arrangement of the audio segments for letters to be recognized in the audio information comprises:

for text to be input of a password type, calculating, for an audio segment for each letter to be recognized, distances between the audio segment for the letter to be recognized and letter template samples in a preset letter sample library as multiple target distances corresponding to the audio segment for the letter to be recognized, wherein the preset letter sample library includes a plurality of samples, each of which is an audio corresponding to one letter, a letter template sample corresponds to one letter and is determined from a plurality of samples corresponding to the letter; and obtaining a target letter string based on the multiple target distances corresponding to the audio segments for letters to be recognized, and the arrangement of the audio segments for letters to be recognized in the audio information, and taking the target letter string as the input result of the text to be input;

wherein, calculating, for an audio segment for each letter to be recognized, distances between the audio segment for the letter to be recognized and letter template samples in a preset letter sample library as multiple target distances corresponding to the audio segment for the letter to be recognized comprises:
  for the audio segment for the letter to be recognized, aligning the audio segment for the letter to be recognized with each of the letter template samples in the preset letter sample library; and
  for the audio segment for the letter to be recognized, extracting a first Mel frequency cepstrum coefficient of the aligned audio segment for the letter to be recognized and a second Mel frequency cepstrum coefficient of each letter template sample, and calculating a distance between the audio segment for the letter to be recognized and each letter template sample based on the first Mel frequency cepstral coefficient and the second Mel frequency cepstrum coefficient, so as to obtain the multiple target distances corresponding to the audio segment for the letter to be recognized.

2. The method according to claim 1, wherein obtaining a target letter string based on target distances corresponding to the audio segments for letters to be recognized, and the arrangement of the audio segments for letters to be recognized in the audio information comprises:
  for the audio segment for the letter to be recognized, determining a first preset number of target distances from the multiple target distances corresponding to the audio segment for the letter to be recognized, and determining a letter associated with the letter template samples corresponding to the first preset number of target distances as a target letter corresponding to the audio segment for the letter to be recognized, wherein, any of the first preset number of target distances is smaller than any other target distance in the multiple target distances;
  calculating, for the audio segment for the letter to be recognized, first distances between the audio segment for the letter to be recognized and reference samples in the letter sample library, wherein a reference sample is a sample of the target letter corresponding to the audio segment for the letter to be recognized;
  determining, for the audio segment for the letter to be recognized, a second preset number of first distances from the first distances corresponding to the audio segment for the letter to be recognized, and determining reference letters corresponding to the second preset number of first distances as candidate letters corresponding to the audio segment for the letter to be recognized, wherein, any of the second preset number of first distances is smaller than any other distance in the first distances;
  determining, for the audio segment for the letter to be recognized, the most frequent letter among the candidate letters corresponding to the audio segment for the letter to be recognized, and determining the most frequent letter as an input letter represented by the audio segment for the letter to be recognized; and arranging input letters represented by the audio segments for letters to be recognized according to the arrangement of the audio segments for letters to be recognized in the audio information, to obtain the target letter string.

3. The method according to claim 1, wherein determining an input result for the text to be input based on the type of the text to be input, the audio segment for the letter to be recognized in the text to be input, and the arrangement of the audio segment for the letter to be recognized in the audio information comprises:
  for text to be input of a word type, obtaining, in a preset word library, words having the same number of letters as the number of received audio segments for letters to be recognized as multiple candidate words;
  determining a candidate probability of each candidate word based on the audio segment for the letter to be recognized and the arrangement of the audio segment for the letter to be recognized in the audio information; and
  determining, according to the candidate probabilities, a third preset number of candidate words among the multiple candidate words as an input result for the text to be input, wherein the probability of any of the third preset number of candidate words is greater than any other candidate word in the multiple candidate words.

4. The method according to claim 3, wherein determining a candidate probability of each candidate word based on the audio segments for letters to be recognized and the arrangement of the audio segments for letters to be recognized in the audio information comprises:
  calculating, for the audio segment for the letter to be recognized, second distances between the audio segment for the letter to be recognized and samples in the letter sample library; and calculating, based on the calculated second distances, probabilities that the letter to be recognized corresponds to letter template samples as multiple alternative probabilities;
  for each candidate word, determining, according to the arrangement of the audio segments for letters to be recognized in the audio information, audio segments for letters to be recognized corresponding to letters contained in the candidate word as target audio segments for letters contained in the candidate word;
  determining, for each letter contained in each candidate word, a target probability of the letter, wherein the target probability is a probability in the multiple alternative probabilities of the target audio segment for the letter that corresponds to the target letter template sample, and a target letter template sample is a letter template sample corresponding to the letter in the letter sample library; and
  for each candidate word, calculating a product of the target probabilities of letters contained in the candidate word as a candidate probability of the candidate word.

* * * * *